United States Patent
Ellis et al.

[15] 3,678,566
[45] July 25, 1972

[54] FRICTION WELDING

[72] Inventors: Colin R. G. Ellis, Newton; Rodger H. Lilly, Comberton, both of England

[73] Assignee: The Welding Institute, Cambridge, England

[22] Filed: July 13, 1970

[21] Appl. No.: 54,342

[30] Foreign Application Priority Data

July 16, 1969 Great Britain......................35,790/69

[52] U.S. Cl....................................29/470.3, 156/73, 228/2, 228/9
[51] Int. Cl..........................................B23k 27/00
[58] Field of Search................29/470.3; 228/2, 9, 8; 156/73

[56] References Cited
UNITED STATES PATENTS 3,549,076 12/1970 Mills.....................................228/2
3,455,494 7/1969 Stamm..................................228/2

Primary Examiner—John F. Campbell
Assistant Examiner—R. J. Craig
Attorney—Kemon, Palmer & Estabrook

[57] ABSTRACT

In a friction welding process, the rate of axial shortening of the workpieces due to burn-off during their relative rotation under axial pressure is measured and used as a guide to the quality of the weld. Deviation between the desired and actual burn-off rates may be used to adjust the axial pressure to reduce this deviation. As an alternative, the speed of relative rotation may be adjusted instead of the axial pressure.

15 Claims, 7 Drawing Figures

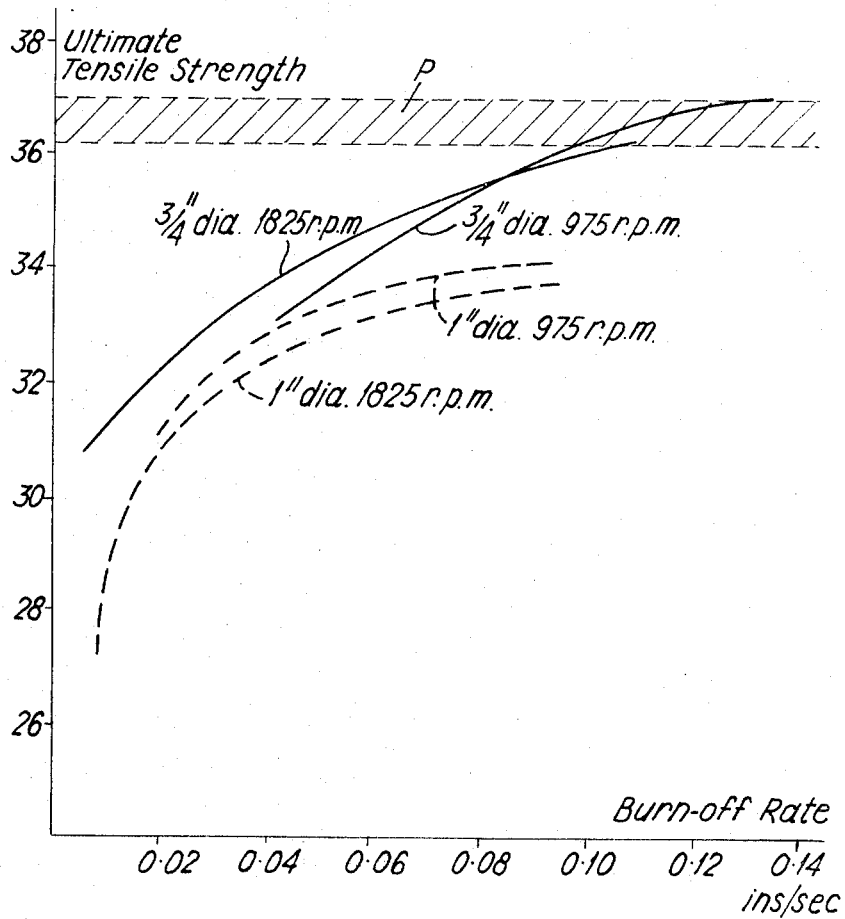

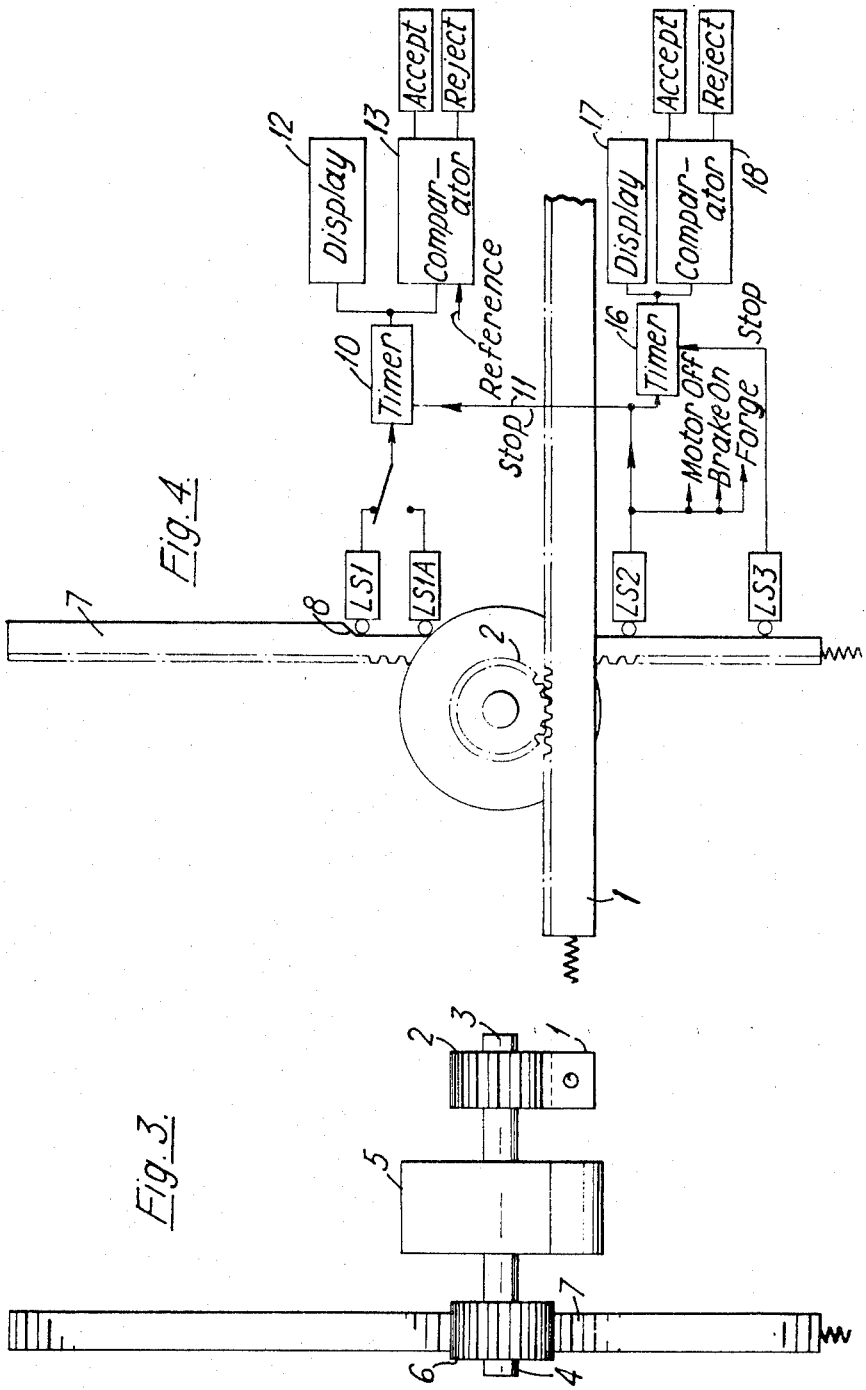

FRICTION WELDING

In commercial friction welding, quality control is based on monitoring the friction welding machine parameters during the welding cycle and/or routine batch destructive testing. The monitoring method assumes that the values of the machine parameters which are obtained correspond to the values at the weld interface. A better method which has been proposed is to measure the magnitude of the burn-off or upset, that is to say the axial shortening of the workpiece during the welding cycle. The measurement of the axial shortening of the workpieces is a direct measurement of the effect of the machine parameters on the region in which the weld is being produced. It also indicates the extent of radial extrusion of the interface material and therefore the removal of the contamination present on the original butting surfaces. The burn-off distance is therefore a useful criterion in that it must be sufficient to ensure that impurities at the center of the section have been displaced into the upset collar.

However, we have discovered that the weld strength is closely related to the burn-off rate, which is thus a more useful criterion than the burn-off distance. For any given material, there is a constant preferred burn-off rate which is substantially independent of the specimen area and rotational speed over a range which is usually at least ±20 percent for each of these parameters and may be much higher, and therefore minor variations in specimen area or in the relative rotational speed of the workpieces are of little consequence provided that the burn-off rate is held within an acceptable range. Mild steel is an example of a material which is not very sensitive to changes of area and speed. The preferred burn-off rate for mild steel would provide tensile strength equivalent to the unwelded parent material for a change of ±50 percent of workpiece area and speed of rotation.

According to the present invention, the rate of axial shortening of the workpieces due to burn-off during their rotation under pressure is measured and is compared with rates of axial shortening for which the weld quality has previously been ascertained. If automatic control is required, the result of the comparison can be used to control a correction system which adjusts the pressure or relative speed of rotation of the workpieces in response to any error in burn-off rate so as to reduce this error. If desired, the quality monitor may also measure the burn-off distance and may ensure that the cycle is continued until the required burn-off distance has been achieved.

In the friction welding process, the axial pressure on the workpieces during their relative rotation may be maintained at substantially the same level for a period after the end of the relative rotation or it may be increased to provide a "forging" pressure in a second stage beginning with the end of the relative rotation or a little before or after the end of relative rotation. The axial shortening rate during the second stage can be used as a further criterion of weld quality, with or without measurement of the absolute axial shortening during forging. Again, the results of these measurements can be used in a feedback loop to control the magnitude of pressure or the duration of the forging stage.

The relationship between the burn-off rate and the weld strength also holds when dissimilar metals are joined by friction welding.

In machines embodying the invention which have closed-loop control systems, the control system itself tends to hold constant the burn-off. Where the control system is not of the closed-loop kind, for many metals and combinations of metals, the burn-off rate is still approximately constant during the rotational portion of a friction welding cycle, once the viscous interface has been formed. For some other metals or combinations of metals, the burn-off rate is not so uniform but the average burn-off rate over the period from the commencement of relative axial displacement of the workpiece to the termination of their driven relative rotation (or at least the major portion of this period) is the value required for the purposes of the present invention.

In both cases, as an alternative to direct measurement of velocity the rate of burn-off can be measured as the time required for a predetermined relative axial displacement or burn-off distance to be achieved.

In order that the invention may be better understood one example will now be described with reference to the accompanying drawings, in which:

FIG. 2 is a graph showing ultimate tensile strength plotted against burn-off rate;

FIGS. 3 and 4 are an end view and a view in side elevation of apparatus for measuring the burn-off rate, FIG. 4 including a block diagram of an electrical circuit;

Figure 1:
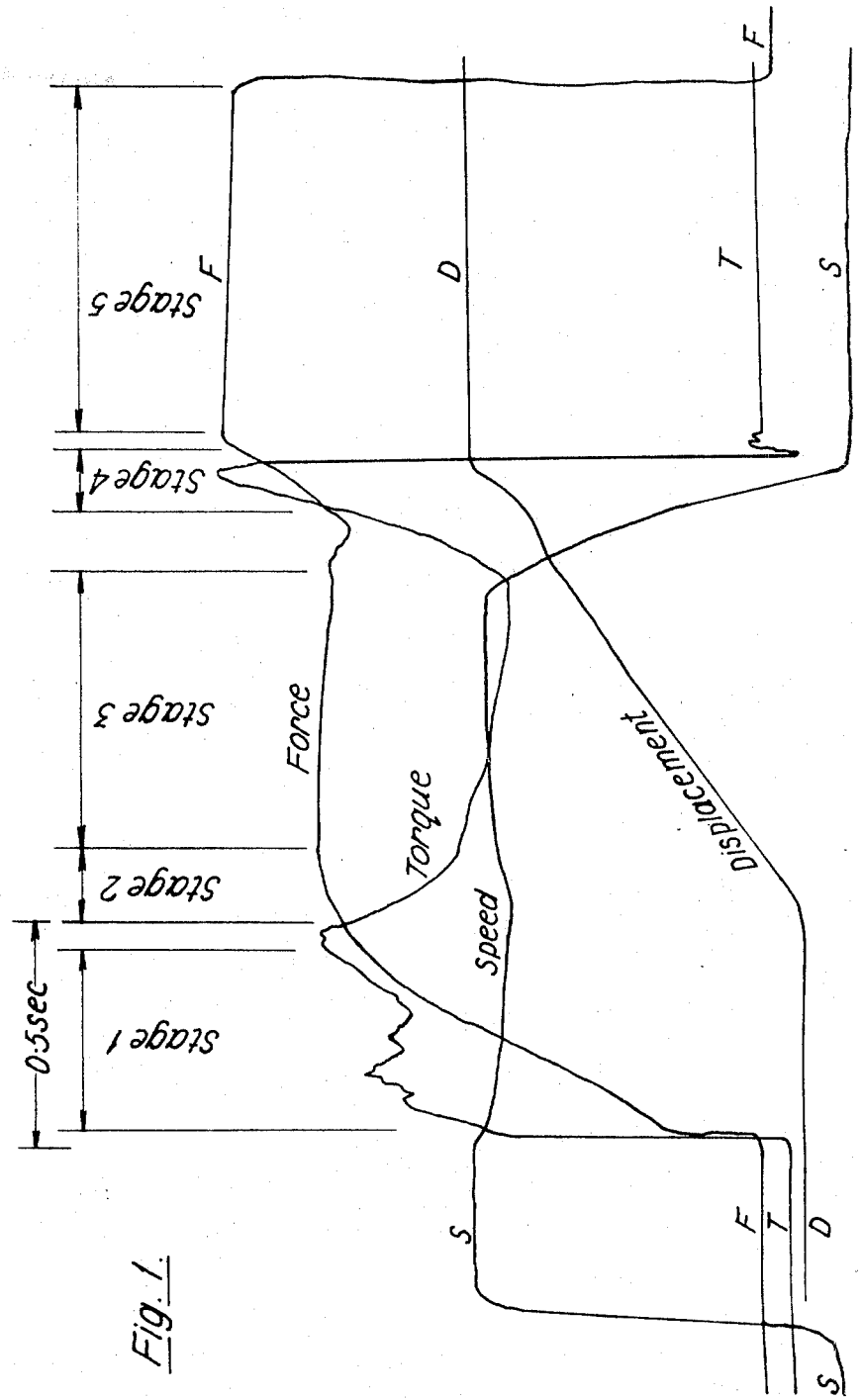
FIG. 1 is a record of a friction welding cycle.

FIG. 1 shows a typical instrumentation record of a friction welding cycle with curves for relative rotational speed of the workpieces, axial load, torque developed, and burn-off distance, all plotted against time. It is a record of a friction weld between an aluminum workpiece and a titanium workpiece. Assuming one of the workpieces to be non-rotating, the other is run up to rotational speed before the start of the weld and at the beginning of stage 1 the workpieces contact one another and an axial force is applied. This axial force builds up throughout stage I during which surface films on the workpiece ends break down and local high spots are worn away. This results in violent torque transients but the bulk burn-off is negligible. At the beginning of stage II, a common viscous interface is developed and thereafter the torque begins to fall from the peak value. Shortly after the torque peak, the relative axial displacement or burn-off of the workpieces commences at a rate dependent on the applied pressure, the speed and the area of the workpiece ends. In the initial portion of stage III, the torque reduces to a fairly steady value, the welding conditions being thereafter substantially in equilibrium. The upset material forms a "collar" including a narrow interfacial zone, common to both workpieces. At the end of stage III, the application of rotational driving force to the rotatable workpiece is stopped, with the result that deceleration takes place between the workpieces. During this period, in spite of the deceleration the torque rises to reach a new peak, the rise being probably due to a change in the properties of the common interface. The new peak torque is maintained for a finite period of the deceleration, after which the speed of rotation has decreased so much that the torque peak can no longer be held. The torque peak is believed to correspond with the shear strength of the interface, resulting in the radial extrusion of metal at the hot interface. The interfacial region generally increases in width, and the rate of upset or burn-off increases, particularly if (as in FIG. 1) the applied axial pressure is increased when the rotational driving source is uncoupled or shortly thereafter. In the final stage, when the rotation has stopped and axial shortening due to the compressive load has terminated, the joined workpieces cool under the compressive load. Thereafter, the collar can be removed.

The correlation between burn-off rate and ultimate tensile strength is shown in the graph of FIG. 2 which is for cold-drawn mild steel. It will be seen that the ultimate tensile strength increases progressively as the burn-off rate is increased to the point at which it approaches or even equals the parent metal strength shown by band P. Furthermore, it will be seen that change of rotational speed of workpieces of the same diameter has little effect on the relationship between the burn-off rate and the ultimate tensile strength. The two curves shown in full lines are for welds made with workpieces of the same diameter with rotational speeds which were almost in the ratio of 2:1. The same speed ratio was used for the two dotted line characteristics which correspond to workpieces of a bar diameter different from that of the workpieces used for the two full line curves. The ratio of the diameters was 4:3 so that the ratio of the workpiece areas was 16:9, or almost 2:1. Thus, for this material the relationship between ultimate tensile strength and burn-off rate is substantially independent of specimen area and rotational speed over a wide range of each of these parameters, and is also substantially independent of axial pressure variations for a range of axial pressures from about 1 or 2 tons/sq.in. to 10 tons/sq.in.

For a joint between aluminum and titanium rods, we found that a rate of 0.27 inch per second was our preferred value, although values up to 20 percent below this gave satisfactory results.

For some materials, the weld strength may reach a peak with increasing burn-off rate and then decrease if the burn-off rate rises further. In some cases, the burn-off rate is not linear and in some cases the instantaneous rate can be measured and compared by plotting the rate (for example on paper or on the screen of a monitoring cathode ray tube) alongside a predetermined ideal rate curve. As an example, the burn-off rate can be matched to a "mask" of the preferred rate curve in this way. Where a record is made of the burn-off rate in the course of a weld, the record may be printed as a ticket which can thereafter accompany the welded component a guarantee of its quality.

In the apparatus shown in FIGS. 3 and 4, the quality monitor comprises a burn-off control based on monitoring the rate of axial shortening and also the amount of shortening. A rack 1 is connected directly to the part of the friction welding machine which supports the axially moving workpiece. Traverse of this workpiece before it makes contact with the other workpiece causes movement of the rack in the direction indicated by the arrow and causes rotation of the pinion wheel 2. Shafts 3 and 4 are axially in line and are connected by way of an electromagnetic clutch 5 which is initially deenergized. When the workpieces make contact an increase of pressure in a force cylinder is sensed by a pressure switch (not shown) and at a particular value of pressure the switch completes an electrical circuit which energizes the electromagnetic clutch and therefore connects shafts 3 and 4. Thus any further movement due to shortening of the workpiece will act through the rack 1 to produce rotation of the pinion wheel 2 and a further pinion wheel 6 together with movement of a further rack 7 which has a cam 8 on one edge. When it is required, the start of burn-off is detected by operation of the limit switch LS1 by the movement of the cam on the rack 7. A further limit switch LS1A can be used, if desired, to control the commencement of the monitoring of the burn-off rate. A selector switch 9 connects either the switch LS1 or the switch LS1A to a timer 10 and operation of the selected switch starts the timer. When the limit switch LS2 is operated, the required burn-off distance has been obtained and the timer 10 is stopped by a signal on line 11. Other electromechanical or solid state switching circuits are completed to switch off the drive motor, to apply a brake if necessary, and to increase the pressure if required.

The period indicated by the timer 10 for the fixed burn-off distance represents the rate of burn-off. It is shown in a display unit 12 and is compared in comparator 13 with a previously ascertained reference value indicative of the optimum burn-off rate. Tolerance limits can be established and can be set up on the comparator system to indicate whether a weld falls within or outside an acceptable range and if desired a visible or audible "accept" or "reject" indication can be provided.

In a dual-pressure cycle process, the operation of the limit switch LS2 operates a solenoid valve to increase the pressure applied to the ram. Simultaneously with the commencement of this "forging" pressure, a second timer 16 starts to measure the time required for an axial shortening corresponding to the distance between the limit switches LS2 and LS3. The operation of limit switch LS3 stops this timer 16 and again the timed interval, indicative of the rate of shortening during the second pressure stage, is displayed on a display unit 17 and is compared in comparator 18 with a previously ascertained optimum value or with the limiting values of a tolerance range to determine whether the weld is to be accepted or rejected.

On completion of the welding operation the electromagnetic clutch 5 is de-energized and the racks 1 and 7 are returned by springs to their datum positions. The locations of the limit switches can be independently changed by micrometer adjustment.

Whilst the arrangement of the racks and pinions, with the electromagnetic clutch, is a very convenient method of detecting contact of the workpieces and of initiating the operation of the timer, contact could alternatively be sensed by detecting change of power, torque, pressure, vibration or sound. A plunger in a proximity gauge can be used to provide a signal representing the axial shortening of the workpieces, instead of the rack and pinion system.

In the apparatus shown in FIGS. 3 and 4, the switch LS2 may be so arranged in conjunction with a delay device that the forging pressure is applied a little before or a little after the end of the driven relative rotation.

Figure 5:
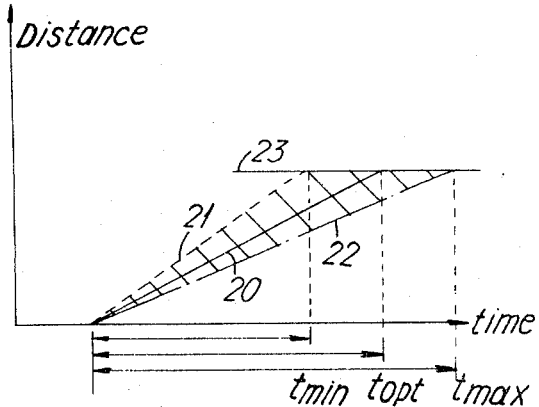
FIG. 5 is a graph illustrating the method of rate measurement used in FIGS. 3 and 4.

FIG. 5 shows a simplified graph of axial shortening against time, the full line 20 defining the predetermined ideal burn-off rate and the dotted and chain-dotted lines 21 and 22 defining the maximum and minimum acceptable burn-off rates. The horizontal line 23 defines the axial shortening required to ensure the removal of contamination. The time at which the limit switch LS2 of FIG. 4 operated is compared with the times $T_{min}$ and $T_{max}$ of FIG. 5 and an acceptable weld is indicated if the limit switch operates between these two times.

Figure 6:
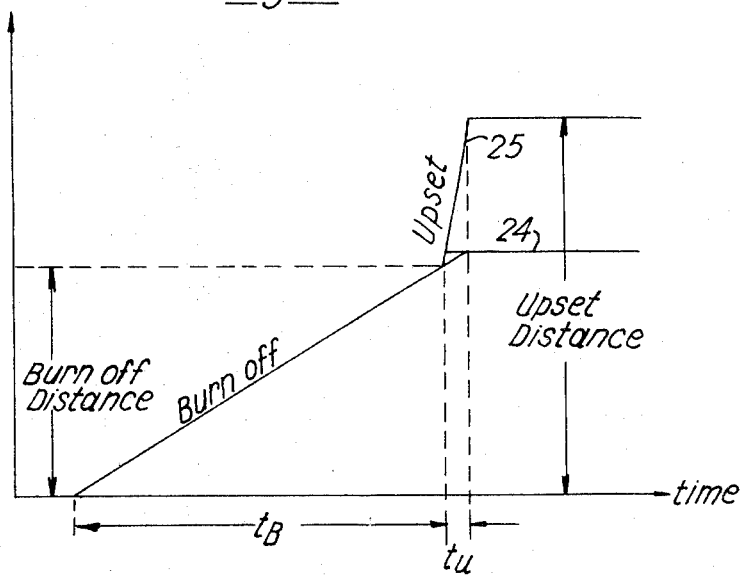
FIG. 6 is a graph showing the effect of using a double-pressure welding cycle; and, FIG. 7 shows diagrammatically hydraulic apparatus for a closed-loop control system responsive to burn-off rate.

FIG. 6 illustrates the difference in shortening due to upset when a higher upsetting or forging pressure is applied in the final stage of the welding operation. When the axial pressure is maintained at substantially the same value after the rotational driving source has been uncoupled, the axial shortening due to upset is comparatively small (as shown by line 24). When a higher upsetting pressure is applied the axial shortening due to upset is larger, as indicated by line 25. During the period of shortening after the end of the driven rotation, a comparison may be made between the rate of upset shortening and predetermined maximum and minimum rates of upset shortening.

Figure 7:
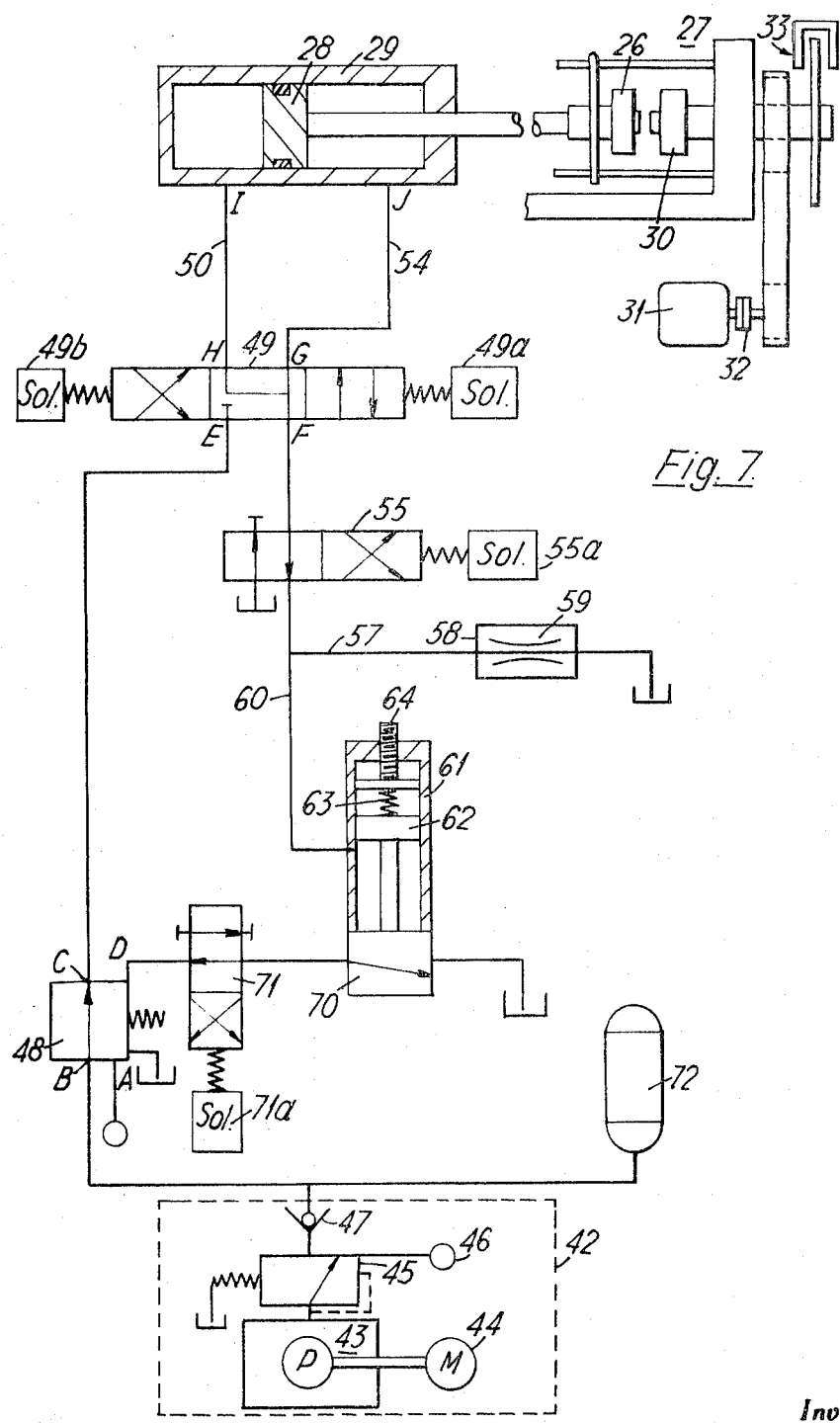

FIG. 7 shows hydraulic control apparatus for automatic control of rate of burn-off. The axially movable chuck 26 of a friction welding machine 27 is connected to the piston 28 of a hydraulic ram 29. The friction welding machine also includes an axially fixed but rotatable chuck 30 drive by a motor 31 through a clutch 32. A brake 33 is provided for arresting rotation of chuck 30. The ram 29 receives oil from a hydraulic power source 42 including a pump 43 driven by a motor 44, a relief valve 45, a gauge 46 and a non-return valve 47. Oil from the power source passes through a pressure control valve 48 by way of its ports B and C, through a directional control valve 49 by way of its ports E and H, along line 50 to port I of the hydraulic ram 29. The directional valve 49 is of the changeover kind and the connection between its ports are governed by solenoids 49a and 49b. For the condition which is being described solenoid 49a is energized and solenoid 49b de-energized. Movement of the piston within the hydraulic ram due to the entry of oil from line 50 displaces oil through port J into line 54. From line 54, the oil passes through ports G and F of the directional control valve 49 to port M of a further directional valve 55 controlled by a solenoid 55a. When solenoid 55a is energized, the oil is passed to the tank circuit, so that movement of the piston of the hydraulic ram 29 takes place unhindered when high-pressure oil is delivered to port I. This condition is used to bring the workpieces into contact with one another, that is to say before burn-off commences. During burn-off, the solenoid 55a is de-energized and a part of the oil passing through the valve 55 then goes from port L along a line 57 to a flow-regulating valve 58 containing a constriction 59, the remainder of the oil from port L passing along a line 60 to the annular side of a hydraulic ram control module 61 including a piston 62 operating against a biasing spring 63, the position of which is preset by means of a screw 64. The constriction in the flow-regulating valve 48 creates a pressure rise in the lines 57 and 60 and this is communicated to the hydraulic control module 61. The magnitude of the pressure varies with the rate of movement of the piston in the hydraulic ram 29 and therefore also varies with the axial shortening of the workpieces. The magnitude of the pressure in the line 60 controls the position of the piston 62 and this in turn controls the condition of a remote control valve 70. The remote control valve operates through a directional valve 71, when solenoid 71a is de-energized, to control the setting of the pressure control valve 48 and this in turn adjusts the pressure of oil at the intake of the hydraulic ram 29 and thereby adjusts the burn-off rate. The system is thus a closed loop which adjusts itself until the burn-off rate corresponds to the reference value set by the spring and the restriction in the regulating valve. If the burn-off rate is too small, the flow from port J of ram 29 will be low and there will be relatively unrestricted flow through regulating valve 58 to the tank circuit. The pressure in line 60 will be low and the spring 63 will push the piston 62 downwards (in FIG. 7), causing the valve 48 to develop a higher pressure. Similarly, if the burn-off rate is too high, the pressure in line 60 will be high, piston 62 will rise and the pressure developed by valve 48 will fall. An accumulator 72 provides a reserve of the hydraulic fluid. In effect, the spring sets the maximum burn-off rate and the restriction is the ultimate reference for the desired value. Thus, if there is a change in the materials to be welded together, requiring a fresh burn-off rate, the restriction in the flow-regulating valve 59 is altered.

If more than one axial shortening rate is required in a single welding cycle (corresponding for example to different rates of burn-off and upset shortening), different control systems of the kind shown in FIG. 7 can be switched in successively.

On completion of burn-off, solenoids 55a and 71a are energized. This breaks the feedback loop and by-passes the oil to the tank circuit. The pressure delivered to the ram 29 then increases to the forging value preset by the valve 48. At the end of the forging period, solenoid 49a is de-energized and solenoid 49b is energized, with the result that the connections in valve 49 are changed over and the piston in ram 29 returns in readiness for the next cycle.

The control valve 48 can be used to adjust relative rotational speed of the workpieces instead of axial pressure, or to adjust both pressure and speed.

Although the system shown in FIG. 7 is completely hydraulic, it will be clear that an electro-hydraulic system can be used as an alternative. In such a case, a velocity transducer can measure the burn-off rate and provide a corresponding electric signal which is compared with a reference value, any error being used to adjust the axial pressure through a servo valve, or to adjust the speed of rotation or to adjust both of these parameters.

In order to avoid very high torques bing developed during the early stages of welding, it is possible to incorporate a diaphragm in the circuit between port H of valve 49 and port I of hydraulic ram 29 so that the pressure is initially built up slowly. Alternatively, the torque-limiting system described in our Patent application Ser. No. 653,772 can be used in conjunction with this circuit.

Although the above description has been primarily concerned with the friction welding of metals, the invention can also be applied to non-metals.

Instead of continuous drive to the rotatable workpiece during the welding operation, the process known as "inertia welding" may be used. In "inertia welding" a rotating flywheel is coupled to the rotatable workpiece, the motor which has driven the flywheel up to speed being disconnected either shortly before contact or simultaneously with contact between the workpieces.

We claim:

1. A method of ascertaining weld quality in a friction welding process including the steps of:
relatively rotating against one another the workpiece portions to be joined, under axial pressure, to generate heat at the interface between said workpiece portions until axial shortening of the workpieces commences due to burn-off at the interface;
measuring the rate of axial shortening of the workpieces due to burn-off during their rotation under pressure;
and comparing the said rate with rates of axial shortening for which the weld quality has previously been ascertained.

2. A method in accordance with claim 1, including deriving a control signal from the said comparison, the signal representing the difference between the actual rate of axial shortening and a previously ascertained rate, and applying the said control signal to adjust the axial pressure applied to the workpieces during rotation in a sense such as to reduce the said difference.

3. A method in accordance with claim 1, including deriving a control signal from the said comparison, the signal representing the difference between the actual rate of shortening and a previously ascertained rate, and applying the said control signal to adjust the relative speed of rotation of the workpieces in a sense such as to reduce the said difference.

4. A method in accordance with claim 1, including additionally measuring the amount of axial shortening and continuing the said relative rotation of the workpieces until a predetermined distance of axial shortening has been achieved.

5. A method in accordance with claim 1, comprising additionally measuring the rate of further axial shortening of the workpieces after the termination of driven relative rotation of the workpieces and comparing the measured value with an upset rate of axial shortening for which the weld quality has previously been ascertained.

6. A method in accordance with claim 5, including deriving a control signal from the said comparison between the actual upset rate, after the termination of driven relative rotation, and a desired upset rate, the said signal representing the difference between the actual and required upset rates, and applying the said control signal to adjust the axial pressure in a sense such as to reduce the difference.

7. A method in accordance with claim 1, in which the rate of axial shortening is measured as the time required for a predetermined distance of axial shortening to take place, and in which the time is compared with a preset time value for the said distance of axial shortening, the method further including the step of indicating whether the time falls within a predetermined range of time values corresponding to a range of values of rate of axial shortening known to produce welds of the required quality.

8. In a friction welding machine, apparatus for ascertaining the quality of a weld between workpieces produced by a friction welding process, said apparatus comprising:
a comparator having means preset in accordance with a rate of axial shortening for which the weld quality is known;
sensing means arranged in said apparatus to be responsive to axial shortening of the workpieces during a friction welding operation carried out in said machine, said sensing means being operatively connected to the comparator, the comparator providing an output indicating whether an acceptable or an unacceptable weld will be produced as a result of the said friction welding operation.

9. Apparatus according to claim 8, said comparator including a timer defining a predetermined interval, means responsive to the time taken for a given movement of axial shortening in a friction welding operation, and means indicating whether the said time falls within the predetermined interval.

10. Apparatus in accordance with claim 9, said timer including a limit switch arranged to operate when a predetermined axial shortening of the workpieces has been achieved.

11. Apparatus in accordance with claim 10, including a second limit switch so positioned in relation to the first limit switch that it is operative when a further predetermined axial shortening of the workpieces has been achieved, the comparator including a first comparator unit comparing the time required for operation of the first limit switch with a preset reference time based on the required rate of axial shortening due to burn-off and a second comparator unit comparing the time required for operation of the second limit switch with a preset time corresponding to the required rate of axial shortening due to upset.

12. In a friction welding machine, apparatus for controlling the quality of a weld between workpieces, the machine including means for applying axial pressure between the workpieces during relative rotation between them, the apparatus comprising:

a comparator having means preset in accordance with a reference value of rate of axial shortening for which the weld quality is known;

means responsive to the rate of axial shortening of the workpieces during a friction welding operation, connected to the comparator;

and pressure control means responsive to the output of the comparator to adjust the axial pressure applied to the workpieces in a sense such as to reduce the difference between the reference rate of axial shortening and the actual rate of axial shortening.

13. Apparatus in accordance with claim 12, said pressure control means including a fluid-operated ram for applying axial pressure to the workpieces during the welding operation, the comparator being responsive to flow of fluid from the ram as a consequence of axial shortening of the workpieces to control the fluid pressure acting on the ram to produce the required rate of axial shortening.

14. Apparatus in accordance with claim 13, said comparator including a flow-regulating valve in the path of fluid displaced from the said ram during axial shortening of the workpieces, whereby the pressure on the intake side of the flow-regulating valve varies with the rate of fluid displacement from the ram, and control means responsive to the value of the said pressure on the intake side of the flow-regulating valve to regulate the pressure of fluid acting on the said ram.

15. In a friction welding machine, apparatus for controlling the quality of a weld between workpieces, the machine including variable-speed driving means for relatively rotating the workpieces against one another under axial pressure, the apparatus comprising:

a comparator having means preset in accordance with a reference value of rate of axial shortening for which the weld quality is known;

means responsive to the rate of axial shortening of the workpieces during a friction welding operation, connected to the comparator;

and speed control means responsive to the output of the comparator to adjust the variable speed driving means and thereby the relative rotational speed of the workpieces in a sense such as to reduce the difference between the reference rate of axial shortening and the actual rate of axial shortening of the workpieces.

* * * * *